(12) United States Patent
Hamlin, Jr. et al.

(10) Patent No.: US 7,031,256 B2
(45) Date of Patent: Apr. 18, 2006

(54) METHODS AND APPARATUS FOR IMPLEMENTING LCAS ( LINK CAPACITY ADJUSTMENT SCHEME) SINKING WITH RATE BASED FLOW CONTROL

(75) Inventors: Robert W. Hamlin, Jr., Monroe, CT (US); Sebastien Berne, St. Agne (FR)

(73) Assignee: Transwitch Corporation, Shelton, CT (US)

( * ) Notice: Subject to any disclaimer, the term of this patent is extended or adjusted under 35 U.S.C. 154(b) by 64 days.

(21) Appl. No.: 10/760,510

(22) Filed: Jan. 20, 2004

(65) Prior Publication Data

US 2005/0157736 A1    Jul. 21, 2005

(51) Int. Cl.
*H04J 3/14* (2006.01)
*H04L 12/28* (2006.01)

(52) U.S. Cl. ............. 370/230; 370/235; 370/412; 370/465; 370/535

(58) Field of Classification Search ......... 370/235, 370/236, 395.1, 395.6, 412, 466, 536, 538, 370/542, 465, 516, 517, 907
See application file for complete search history.

(56) References Cited

U.S. PATENT DOCUMENTS

| | | | | |
|---|---|---|---|---|
| 4,961,188 | A | * | 10/1990 | Lau ............................ 370/517 |
| 6,088,360 | A | * | 7/2000 | Amaral et al. .............. 370/412 |
| 6,157,659 | A | * | 12/2000 | Bird ............................ 370/538 |
| 6,675,327 | B1 | * | 1/2004 | Mobin et al. ............... 714/700 |
| 6,687,247 | B1 | * | 2/2004 | Wilford et al. ............. 370/392 |
| 6,744,787 | B1 | * | 6/2004 | Schatz et al. ............... 370/506 |
| 2002/0181499 | A1 | * | 12/2002 | Kfir et al. ................... 370/466 |
| 2004/0120252 | A1 | * | 6/2004 | Bowen et al. .............. 370/229 |

OTHER PUBLICATIONS

"Understanding Virtual Concatenation and Link Capacity Adjustment Scheme in SONET/SDH"; Transwitch; Presented at the 2003 Communications Design Conference; Shelton, Connecticut.

* cited by examiner

*Primary Examiner*—Chau Nguyen
*Assistant Examiner*—Soon D. Hyun
(74) *Attorney, Agent, or Firm*—Gordon & Jacobson, P.C.

(57) ABSTRACT

Methods for extracting packetized data from a SONET/SDH signal include processing the signal to produce a deskewed data stream; demapping the data stream to produce a stream of packets; and temporarily storing the packets in a packet buffer, wherein the demapping is performed at a first rate when the fullness of the buffer is below a fullness threshold and the demapping is performed at a second rate when the fullness of the buffer is at or above the fullness threshold. Apparatus for performing the methods are also disclosed.

10 Claims, 3 Drawing Sheets

METHODS AND APPARATUS FOR IMPLEMENTING LCAS (LINK CAPACITY ADJUSTMENT SCHEME) SINKING WITH RATE BASED FLOW CONTROL

BACKGROUND OF THE INVENTION

1. Field of the Invention

The invention relates to telecommunications, the Synchronous Optical Network (SONET) and the Synchronous Digital Hierarchy (SDH). More particularly, the invention relates to methods and apparatus for preventing the loss of data at an LCAS sink.

2. State of the Art

The Synchronous Optical Network (SONET) or the Synchronous Digital Hierarchy (SDH), as it is known in Europe, is a common telecommunications transport scheme which is designed to accommodate both DS-1 (T1) and E1 traffic as well as multiples (DS-3 and E-3) thereof. A DS-1 signal consists of up to twenty-four time division multiplexed DS-0 signals plus an overhead bit. Each DS-0 signal is a 64 kb/s signal and is the smallest allocation of bandwidth in the digital network, i.e. sufficient for a single telephone connection. An E1 signal consists of up to thirty-two time division multiplexed DS-0 signals with at least one of the DS-0s carrying overhead information.

Developed in the early 1980s, SONET has a base (STS-1) rate of 51.84 Mbit/sec in North America. The STS-1 signal can accommodate 28 DS-1 signals or 21 E1 signals or a combination of both. The basic STS-1 signal has a frame length of 125 microseconds (8,000 frames per second) and is organized as a frame of 810 octets (9 rows by 90 byte-wide columns). It will be appreciated that 8,000 frames*810 octets per frame*8 bits per octet=51.84 Mbit/sec. The frame includes the synchronous payload envelope (SPE) or virtual container (VC) as it is known in Europe, as well as transport overhead. Transport overhead is contained in the first three columns (27 bytes) and the SPE/VC occupies the remaining 87 columns.

In Europe, the base (STM-1) rate is 155.520 Mbit/sec, equivalent to the North American STS-3 rate (3*51.84=155.520). The STS-3 (STM-1) signals can accommodate 3 DS-3 signals or 63 E1 signals or 84 DS-1 signals, or a combination of them. The STS-12 signals are 622.080 Mbps and can accommodate 12 DS-3 signals, etc. The STS-48 signals are 2,488.320 Mbps and can accommodate 48 DS-3 signals, etc. The highest defined STS signal, the STS-768, is nearly 40 Gbps (gigabits per second). The abbreviation STS stands for Synchronous Transport Signal and the abbreviation STM stands for Synchronous Transport Module. STS-n signals are also referred to as Optical Carrier (OC-n) signals when transported optically rather than electrically.

To facilitate the transport of lower-rate digital signals, the SONET standard uses sub-STS payload mappings, referred to as Virtual Tributary (VT) structures. (The ITU calls these Tributary Units or TUs.) This mapping divides the SPE (VC) frame into seven equal-sized sub-frames or VT (TU) groups with twelve columns of nine rows (108 bytes) in each. Four virtual tributary sizes are defined as follows.

VT1.5 has a data transmission rate of 1.728 Mb/s and accommodates a DS1 signal with overhead. The VT1.5 tributary occupies three columns of nine rows, i.e. 27 bytes. Thus, each VT Group can accommodate four VT1.5 tributaries.

VT2 has a data transmission rate of 2.304 Mb/s and accommodates a CEPT-1 (E1) signal with overhead. The VT2 tributary occupies four columns of nine rows, i.e. 36 bytes. Thus, each VT Group can accommodate three VT2 tributaries.

VT3 has a data transmission rate of 3.456 Mb/s) and accommodates a DS1C (T2) signal with overhead. The VT3 tributary occupies six columns of nine rows, i.e. 54 bytes. Thus, each VT Group can accommodate two VT3 tributaries.

VT6 has a data transmission rate of 6.912 Mb/s and accommodates a DS2 signal with overhead. The VT6 tributary occupies twelve columns of nine rows, i.e. 108 bytes. Thus, each VT Group can accommodate one VT6 tributary.

As those skilled in the art will appreciate, the original SONET/SDH scheme as well as the VT mapping schemes were designed to carry known and potentially foreseeable TDM signals. In the early 1980s these TDM signals were essentially multiplexed telephone lines, each having the (now considered) relatively small bandwidth of 56–64 kbps. At that time, there was no real standard for data communication. There were many different schemes for local area networking and the wide area network which eventually became known as the Internet was based on a "56k backbone". Since then, Ethernet has become the standard for local area networking. Today Ethernet is available in four bandwidths: the original 10 Mbps system, 100 Mbps Fast Ethernet (IEEE 802.3u), 1,000 Mbps Gigabit Ethernet (IEEE 802.3z/802.3ab), and 10 Gigabit Ethernet (IEEE 802.3ae).

In recent years it has been recognized that SONET/SDH is the most practical way to link high speed Ethernet networks over a wide area. Unfortunately, the various Ethernet transmission rates (10 Mbps, 100 Mbps, 1,000 Mbps, and 10,000 Mbps) do not map well into the SONET/SDH frame. For example, the original 10 Mbps Ethernet signal is too large for a VT-6 tributary but too small for an entire STS-1. In other words, under the existing SONET/SDH schemes, in order to transport a 10 Mbps Ethernet signal, an entire STS-1 path must be used, thereby wasting a significant amount of bandwidth. Similar results occur when attempting to map the faster Ethernet signals into STS signals.

In order to provide a scheme for efficiently mapping Ethernet signals (as well as other signals such as Fiber Channel and ESCON) into a SONET/SDH frame, the Virtual Concatenation Protocol was created and has been endorsed by the ITU as the G.707 standard. Similar to inverse multiplexing, Virtual Concatenation combines multiple links (members) into one Virtual Concatenation Group (VCG), enabling the carrier to optimize the SDH/SONET links for Ethernet traffic. For example, using virtual concatenation, five VT-2 (2 Mbps) links can be combined to carry a 10 Mbps Ethernet signal, resulting in full utilization of allotted bandwidth. Two STS-1 (51 Mbps) links can be combined to carry a 100 Mbps Ethernet signal, etc. Virtual Concatenation uses SONET/SDH overhead bytes (four of the sixteen "H4" bytes) to indicate two numbers: the multiframe indicator (MFI) and the sequence number (SQ).

The different tributaries that make up a VCG are allowed to follow different paths through the network. This means that group members that leave a network node at the same time and properly interleaved will arrive at their destination at different times with respect to each other. It is the responsibility of the receiver to remove this differential delay (or skew) between group members and restore their proper order before demapping the payload contents.

Part of the Virtual Concatenation Protocol includes methods for dynamically scaling the available bandwidth in a SONET/SDH signal. These methods are known as the Link Capacity Adjustment Scheme or LCAS. LCAS is a powerful network management tool because customer bandwidth requirements change over time. One simple example is a network user who, during business hours, needs only enough bandwidth to support electronic mail and worldwide web access. During non-working hours, however, the same network user may wish to conduct relatively large data transfers from one location to another to backup daily transactions, for example. It would be desirable to alter the user's available bandwidth as needed. LCAS provides a means to do this without disturbing other traffic on the link. LCAS has been endorsed by the ITU as the G.7042 standard which is hereby incorporated by reference herein in its entirety.

LCAS creates a bidirectional communication scheme between a transmitter and a receiver (the source and sink respectively) that allows the size of a VCG to be modified "on the fly", theoretically with no disruption of data. The source, through an in-band communication channel, sends a message to the sink that group members are about to be added or removed, then sends a synchronization message so that the sink knows exactly when the change will take effect. Removing group members in the presence of differential delay creates some special problems for maintaining data integrity.

A typical system 10 for recovering packetized (e.g. ETHERNET) data from SONET/SDH with provisions for VCAT and LCAS is shown in prior art FIG. 1. This is the receive (or sink) portion of the SONET/SDH link. The Front End block 12 performs the well known SONET/SDH functions of descrambling, framing, pointer tracking and alignment. The VCAT & LCAS block 14 extracts VCG differential delay information as well as VCG configuration information embedded in one of the SONET/SDH overhead bytes (H4 in high order, K4 in low order). This VCG information together with the payload is then passed to the Deskew Control block 16. The Deskew Control block 16 performs two functions. First, it calculates the amount of differential delay experienced by each tributary, based on the H4/K4 frame counter. Then it stores each tributary in the Deskew FIFO 18 for a different amount of time based its differential delay. Tributaries that are experiencing short network delays must be stored longer to compensate for those tributaries that are experiencing long network delays. The Demapper block 20 reads the Deskew FIFO 18. Since group members are stored for varying amounts of time in the Deskew FIFO 18, when they are read out, their original phase relationship will be restored. The Demapper block 20 may first need to reorder the group members. Then it can demap the original packet data from each group payload. The output of the Demapper block 20 is packet data destined for the ETHERNET client. Usually, a packet-based elastic storage buffer (Packet FIFO) 22 is provided between the Demapper block 20 and the client interface 24. This Packet FIFO 22 is used to hold packet data during times that the output client interface 24 is blocked, may be used to smooth out bursty reads from the Deskew FIFO 18, and may also be used to avoid running out of client data during a packet transfer.

Flow control is feasible (although not necessarily recommended) at several points in the system shown in FIG. 1. For example, if the local client is temporarily not able to accept data, it can temporarily shut off the output of the client interface 24. This will cause more data to be stored in the Packet FIFO 22. If the Packet FIFO 22 becomes full, it is theoretically possible to shut off the demapping process 20 until more space becomes available in the FIFO 22. This will have the effect of causing data to build up in the Deskew FIFO 18. While this may seem like it takes good advantage of available storage space, it has the drawback of creating head-of-line blocking. Since the Deskew FIFO 18 stores SONET/SDH data with no knowledge of packet boundaries, backpressure at a single client interface port would stop the entire Deskew FIFO output, thus stopping data for all client interface ports, including those that are not blocked.

It will be appreciated, however, that if the demapping process were stopped and data were allowed to build up in the Deskew FIFO 18, the next logical step would be to shut off data at its input. This, of course, is not possible since the input to the Deskew FIFO 18 is the arriving SONET payloads, which cannot be stopped or slowed down, and there is no mechanism for applying flow control over the SONET network. Therefore, the Packet FIFO 22, if present, can be used effectively to prevent data loss due to temporary blockage at the client interface 24 output, but backpressure from the Packet FIFO 22 should not be used to stop the demapping process 20. Since the arriving SONET data cannot be flow controlled, a full Packet FIFO 22 must result in data loss. A well designed system should attempt to minimize this condition.

The foregoing description on flow control in the sink system assumes that data is moving through the system at a constant rate. Thus, the only need for flow control comes from rate limitations at the output of the client interface 24. When VCG and LCAS are implemented, other flow control problems are introduced. For example, given a static pre-configured VCG that is not changing in size and is composed of three members, it is possible that the first two members arrive with very little network delay, and the third member has a great deal of network delay. In this example, the differential delay between the first two members is zero, but the differential delay between those members and the third member is T. (In practice, T can be as large as 256 msec and still be compensated.) To compensate for the differential delay, the first two members of the VCG need to be stored in the Deskew FIFO 18 for T seconds, while waiting for the third member which is stored minimally while the VCG is demapped. Under these static conditions, the operation of the Deskew FIFO 18 is such that the long term average input and output rates are exactly the same. Instantaneous rates may vary; both the input and output of the Deskew FIFO 18 might be respectively stored and retrieved in high speed bursts followed by long gaps. However, on average, the input rate is exactly the SONET arrival rate. On the output side, data is read from the Deskew FIFO 18 only when it is available. With such an arrangement, the output rate of the Deskew FIFO 18 is paced by the input (arrival) rate. If, however, the third member of the VCG is removed through an LCAS command, the first two members have T seconds worth of data stored in the Deskew FIFO 18 now ready to read at the maximum rate the demapping process can support. That rate is possibly greater than the output rate of the client interface 24, so the Packet FIFO 22 begins to fill up. The rapid arrival of T seconds worth of data from several group members can overflow the Packet FIFO, resulting in unnecessary data loss.

There are several ways to avoid Packet FIFO overflow, but they all have drawbacks. One solution is to always pace the output with the input, regardless of data availability in the Deskew FIFO 18. With such a system in the example given above, after the slowest member is removed from the VCG, data continues to be read out of the Deskew FIFO 18 at the same rate, and T seconds worth of data remains in the Deskew FIFO 18 indefinitely. This results in a system that can only add and never remove delay through the Deskew FIFO 18. Eventually the Deskew FIFO 18 is likely to be filled to its capacity. Operation can continue error free, but the delay through the Deskew FIFO is unnecessary.

Another solution also paces the output with the input, but when enough data is available in the Deskew FIFO 18, extra reads are performed. This is sometimes done in a fashion similar to SONET pointer movements, thus "leaking" extra data out of the Deskew FIFO 18 at a slow rate. This solution does not guarantee that the Packet FIFO 22 does not overflow as the "leak" times may coincide with a blocked client interface. Also, response times are typically slow, so extra delay through the Deskew FIFO 18 is experienced long after the slow member of a VCG has been removed.

Still another solution is to size the Packet FIFO 22 large enough to handle all of the possible data from the Deskew FIFO 18. While this solution will not lose any data unnecessarily, it is expensive because the storage requirements for the Packet FIFO 22 are typically much less than for the Deskew FIFO 18. This solution also has the effect of temporarily adding undesirable delay through the Packet FIFO 22 while the Deskew FIFO 18 is being emptied.

The most elegant solutions implement a form of Xon/Xoff flow control between the Packet FIFO 22 and the Deskew FIFO 18. In these systems, depth measurements in the Packet FIFO 22 are used to turn on and off the output of the Deskew FIFO 18. Unfortunately, turning off the Deskew FIFO 18 results in the head-of-line blocking described above, so depth measurements in the Deskew FIFO 18 are sometimes used to turn the flow back on. The control mechanism for these systems is very complex, especially when dealing with multiple client ports.

SUMMARY OF THE INVENTION

It is therefore an object of the invention to provide methods and apparatus for preventing or minimizing data loss when sinking a VCG.

It is also an object of the invention to provide methods and apparatus for preventing or minimizing data loss when removing a member from a VCG.

It is another object of the invention to provide such methods and apparatus in a manner which avoids the disadvantages of the prior art.

In accord with these objects which will be discussed in detail below, the methods of the present invention utilize a rate based flow control between the Packet FIFO and the Deskew FIFO and only two rates are used for reading the Deskew FIFO: a maximum rate and an input-limited rate. The maximum rate is the maximum rate of the Demapper and the minimum rate is SONET/SDH arrival rate. A depth measurement of the Packet FIFO is used to determine an upper threshold that is reached when the FIFO is nearly full. Whenever the Packet FIFO depth is below the upper threshold, the demapping process is allowed to run at maximum rate. Once the upper threshold is reached, the Deskew FIFO continues to operate, but the output rate is limited to the input rate. While the upper threshold is reached, it is acceptable for short output bursts to occur faster than the input rate, but the average output rate must be no faster than the input rate. If high speed output bursts are permitted, it is desirable to set the upper threshold of the Packet FIFO at least one burst below full. Efficient implementations should keep the burst size small as well. Although hardware implementations of this method may vary, the method is simple enough that it may be carried out entirely in the Demapper block with fullness information from the Packet FIFO and timing information from the network input. When implementing the methods of the invention, if the client interface output is blocked, the Packet FIFO will continue to fill up and will eventually overflow, but this is an acceptable loss of data, not related to SONET/SDH, VCG, or LCAS processing. No backpressure is ever applied to the Deskew FIFO, so head-of-line blocking is completely eliminated. The entire Packet FIFO is used to its full advantage, and once it is full, if its output is still blocked, the proper response is to drop packets without stopping the demapping process.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
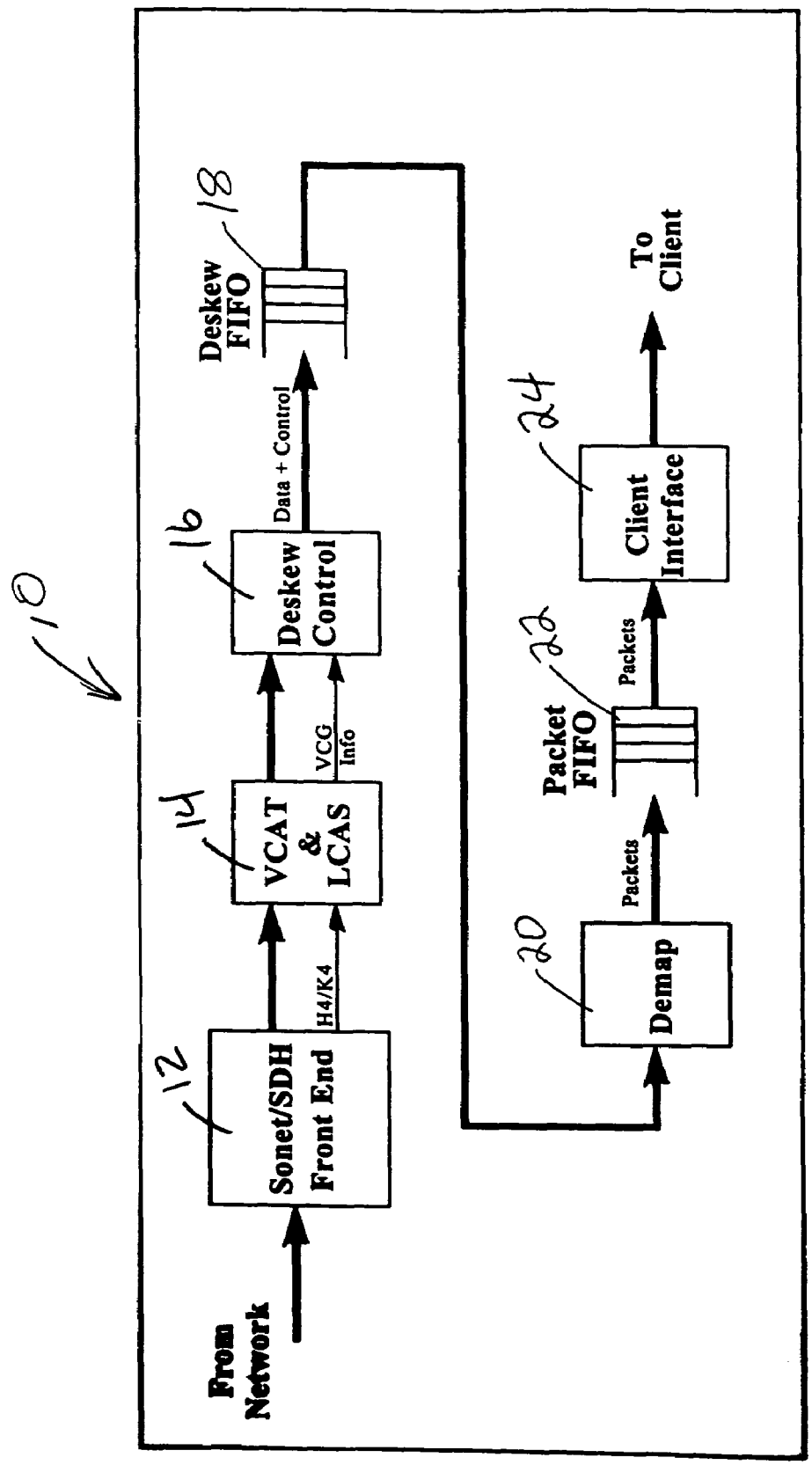
FIG. 1 is a simplified schematic diagram of a generic prior art arrangement for recovering packetized data from a SONET/SDH stream.
Figure 2:
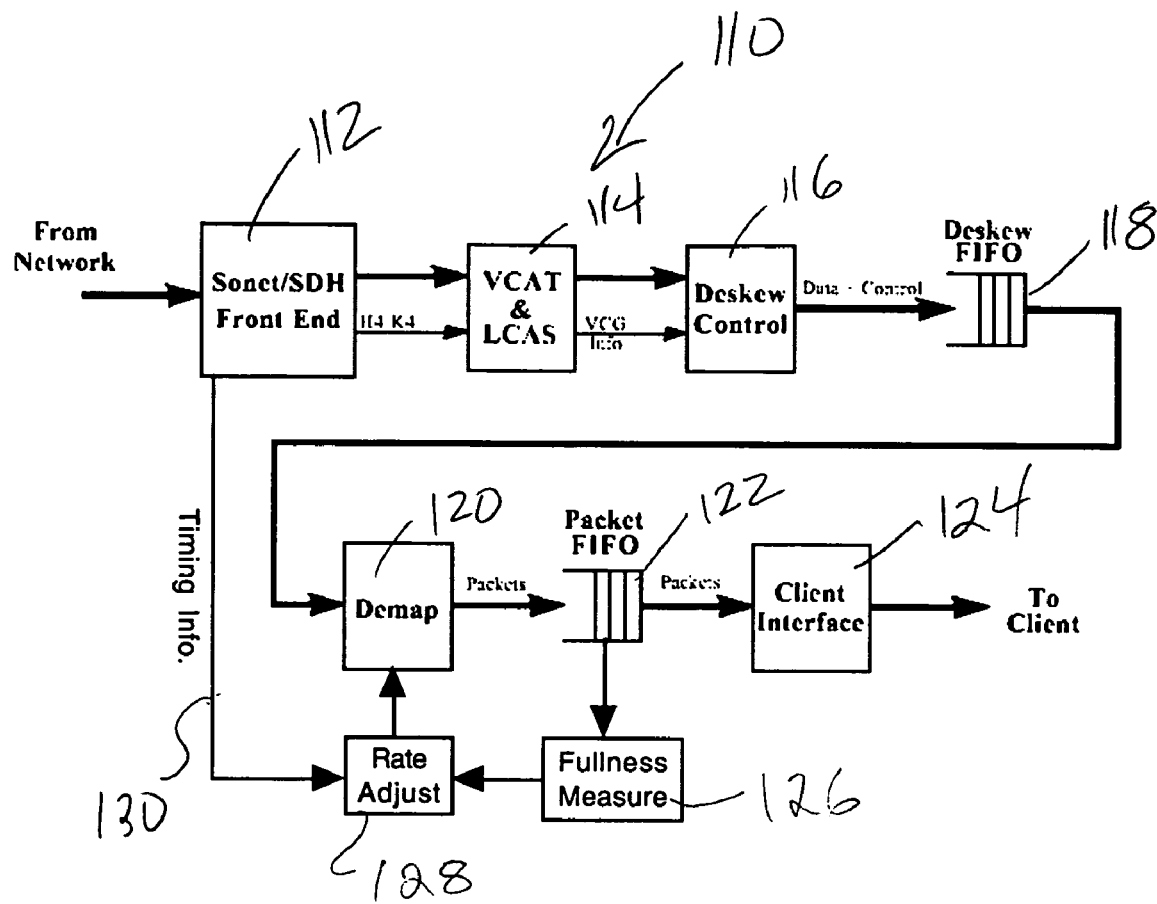
FIG. 2 is a view similar to FIG. 1, illustrating a generic hardware implementation of the methods of the invention.

Referring now to FIG. 2, a system 110 for recovering packetized (e.g. ETHERNET) data from SONET/SDH with provisions for VCAT and LCAS according to the invention is shown. The device 110 is similar in some respects to the device 10 described above and similar reference numerals (increased by 100) refer to similar functional blocks. The Front End block 112 performs the well known SONET/SDH functions of descrambling, framing, pointer tracking and alignment. The VCAT & LCAS block 114 extracts VCG differential delay information as well as VCG configuration information embedded in one of the SONET/SDH overhead bytes (H4 in high order, K4 in low order). This VCG information together with the payload is then passed to the Deskew Control block 116. The Deskew Control block 116 performs two functions. First, based on the H4/K4 frame counter, it calculates the amount of differential delay experienced by each tributary. Then, it stores each tributary in the Deskew FIFO 118 for a different amount of time based on its differential delay. Tributaries that are experiencing short network delays must be stored longer to compensate for those tributaries that are experiencing long network delays. The Demapper block 120 reads the Deskew FIFO 118. Since group members are stored for varying amounts in the Deskew FIFO 118, when they are read out, their original phase relationship will be restored. The Demapper block 120 may need to reorder the group members, and then can demap the original packet data from each group payload. The output of the Demapper block 120 is packet data destined for the ETHERNET client. Usually, a packet-based elastic storage buffer 122 is provided between the Demapper block 120 and the client interface 124. This Packet FIFO 122 is used to hold packet data during times that the output client interface 124 is blocked, may be used to smooth out bursty reads from the Deskew FIFO 118, and may also be used to avoid running out of client data during a packet transfer.

According to the methods of the invention, the operating rate of the Demapper 120 is adjusted by the Rate Adjustment block 128. The Rate Adjustment block receives a fullness measure from the Fullness Measure block 126 which measures the depth of data in the Packet FIFO 122, and a timing signal 130 from the SONET/SDH Front End 112. When the fullness of the buffer 122 is below a selected threshold (based on the size of the buffer and the characteristics of the SONET/SDH signal), the Demapper 120 is set to run at a rate faster than the SONET/SDH signal input rate. When the fullness reaches the threshold, the demapper rate is slowed to substantially the same as the SONET/SDH signal input rate.

Figure 3:
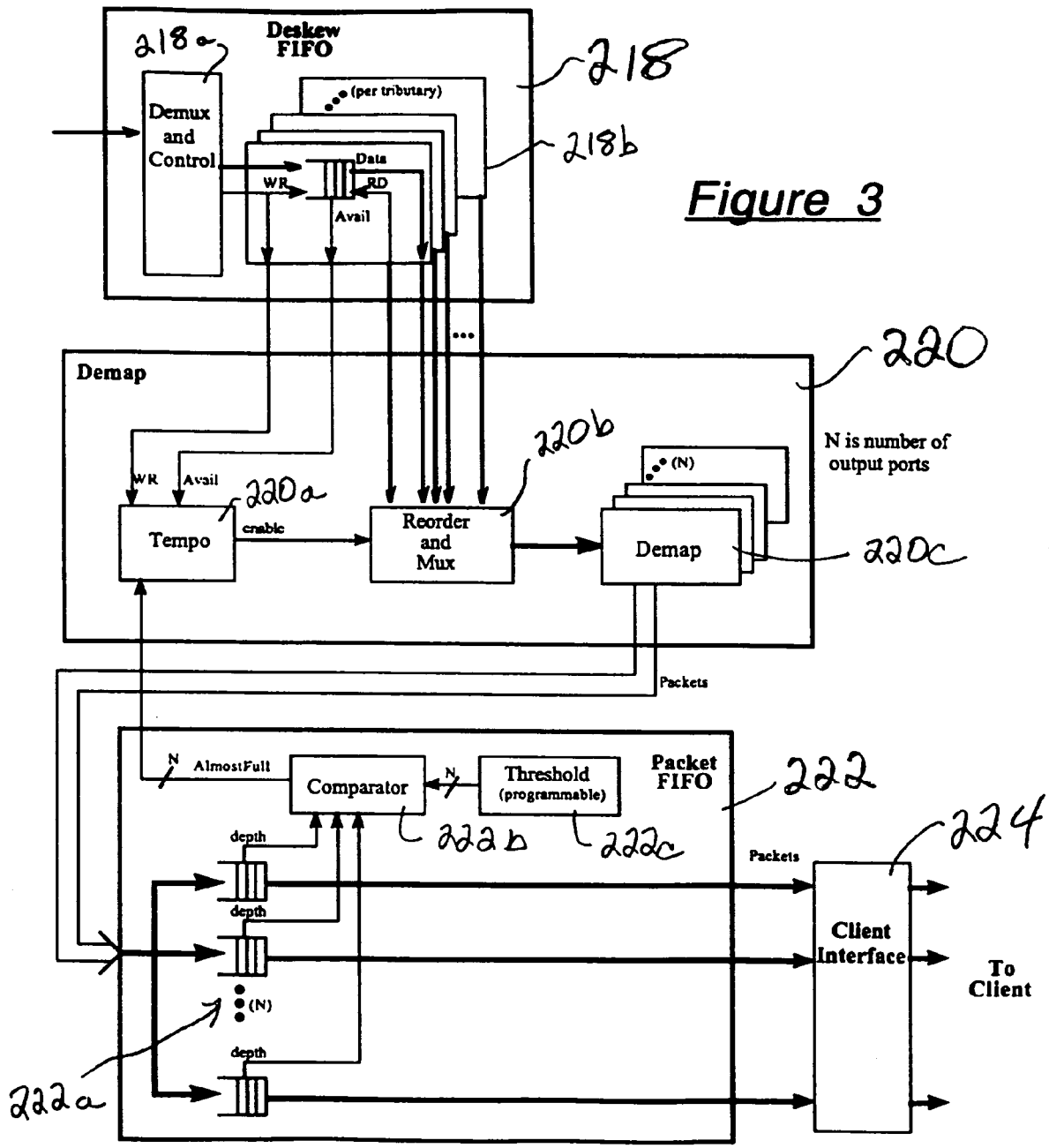
FIG. 3 is a more detailed diagram illustrating the presently preferred embodiment of the invention.

FIG. 3 is a more detailed diagram of a presently preferred implementation of the invention. As seen in FIG. 3, the invention is implemented within the Deskew FIFO 218, the Demapper 220, and the Packet FIFO 222. The Deskew FIFO 218 includes a Demultiplexing and Control circuit 218a which feeds separate elastic storage 218b for each tributary. The Demapper 220 includes a Tempo circuit 220a which receives a write signal WR from the Demux and Control block 218a and a fullness measure Avail from the Deskew FIFO 218. The Avail signal indicates to the Demapper 220 that data is available for demapping and the Demapper 220 uses this signal to enable the Reordering and Multiplexing block 220b to output packets via queues 220c. The output of the Demapper 220 feeds elastic storage 222a in the Packet FIFO 222. Depth measurements for each elastic storage member 222a are fed to a comparator 222b which compares the depth measurements to programmed thresholds 222c. The comparator 222b supplies an Almost Full signal for each elastic storage 222a to the Tempo circuit 220a.

During normal operation, the Demapper 220 reads data from the Deskew FIFO 218 whenever the Avail signal is asserted. This allows the Demapper to operate at its fastest speed. When congestion occurs in the Packet FIFO 222, the Almost Full signal is asserted. This causes the Tempo Circuit 220a to operate the Demapper only when the WR signal is asserted, i.e. at the same speed at which data is written to the Deskew FIFO 218, the SONET/SDH input speed. This assures that no packets are lost in the Packet FIFO due to SONET/SDH signal processing. It will be appreciated, however, that the Client Interface 224 may refuse packets and cause the Packet FIFO to overflow and lose packets. This is the very nature of the ETHERNET protocol that sometimes packets get lost and must be retransmitted.

There have been described and illustrated herein several embodiments of methods and apparatus for extracting packetized data from a SONET/SDH signal. While particular embodiments of the invention have been described, it is not intended that the invention be limited thereto, as it is intended that the invention be as broad in scope as the art will allow and that the specification be read likewise. Thus, while certain blocks of the invention were described as hardware blocks, it will be appreciated that the various portions of the invention may be implemented in hardware, software, firmware, or a combination of any of the three. In addition, while the invention was described as utilizing FIFOs, it will be appreciated that such FIFOs can be implemented in any of a number of manners, and that other memory elements such as RAMs may be utilized. It will therefore be appreciated by those skilled in the art that yet other modifications could be made to the provided invention without deviating from its spirit and scope as so claimed.

The invention claimed is:

1. A method for extracting packetized data from a SONET/SDH signal, said method comprising:
   a) processing the SONET/SDH signal to provide a deskewed data stream;
   b) demapping the data stream to produce a stream of packets;
   c) storing the packets in a packet buffer; and
   d) monitoring the fullness of the packet buffer, wherein
      said demapping is performed at a first rate when the fullness of the buffer is below a fullness threshold,
      said demapping is performed at a second rate when the fullness of the buffer is at or above the fullness threshold, and
      the first rate is faster than the input rate of the SONET/SDH signal.

2. The method according to claim 1, wherein:
   the second rate is substantially equal to the input rate of the SONET/SDH signal.

3. The method according to claim 2, wherein:
   the first rate is substantially the maximum rate of the apparatus used to perform the demapping.

4. An apparatus for extracting packetized data from a SONET/SDH signal, said apparatus comprising:
   a) SONET/SDH signal processing means for processing the SONET/SDH signal to provide a deskewed data stream;
   b) a demapper coupled to said SONET/SDH signal processing means for demapping the data stream to produce a stream of packets;
   c) a packet buffer coupled to said demapper for temporarily storing the packets; and
   d) a fullness monitor coupled to the packet buffer and the demapper for monitoring the fullness of the packet buffer and adjusting the rate of the demapper, wherein
      said demapper operates at a first rate when the fullness of the buffer is below a fullness threshold,
      said demapper operates at a second rate when the fullness of the buffer is at or above the fullness threshold, and
      the first rate is faster than the input rate of the SONET/SDH signal.

5. The apparatus according to claim 4, wherein:
   the second rate is substantially equal to the input rate of the SONET/SDH signal.

6. The apparatus according to claim 5, wherein:
   the first rate is substantially the maximum rate of the demapper.

7. The method according to claim 1, further comprising:
   e) storing deskewed data in a deskew buffer, wherein no backpressure is applied to the deskew buffer.

8. The method according to claim 1, wherein:
   said demapping is performed only at two rates.

9. The apparatus according to claim 4, further comprising:
   e) a deskew buffer coupled to said signal processing means and said demapper, wherein
      said signal processing means writes deskewed data to said deskew buffer and said demapper reads deskewed data from said deskew buffer.

10. The apparatus according to claim 4, wherein:
    said demapper operates at only two rates.

* * * * *